Dec. 14, 1965     K. F. BONE     3,222,991
BEARING PRELOAD MECHANISM FOR MACHINE TOOL
Filed May 22, 1964     2 Sheets-Sheet 1
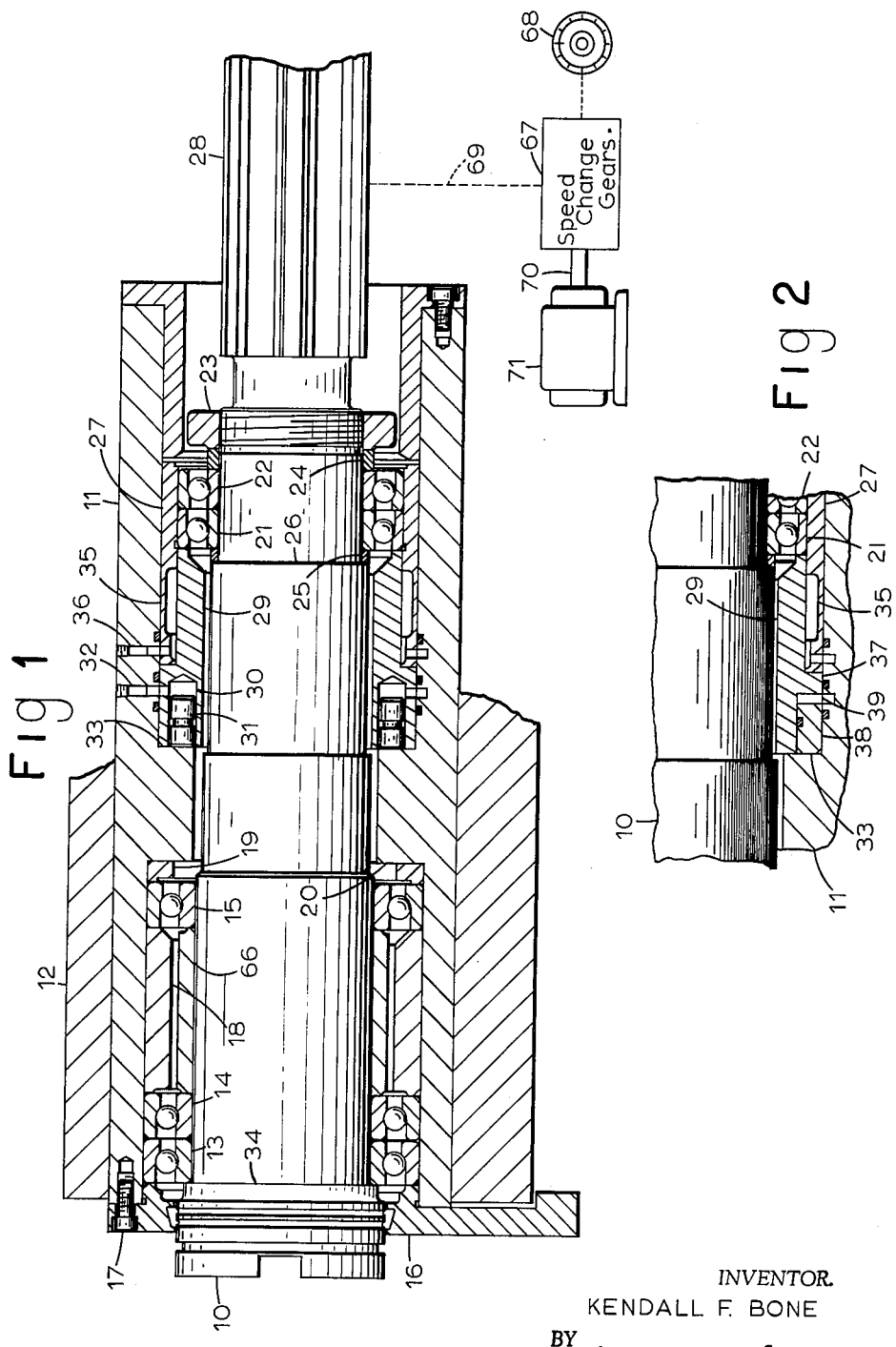
INVENTOR.
KENDALL F. BONE
BY
Howard Keiser
& Jack J. Earl
ATTORNEYS Dec. 14, 1965 K. F. BONE 3,222,991
BEARING PRELOAD MECHANISM FOR MACHINE TOOL
Filed May 22, 1964 2 Sheets-Sheet 2
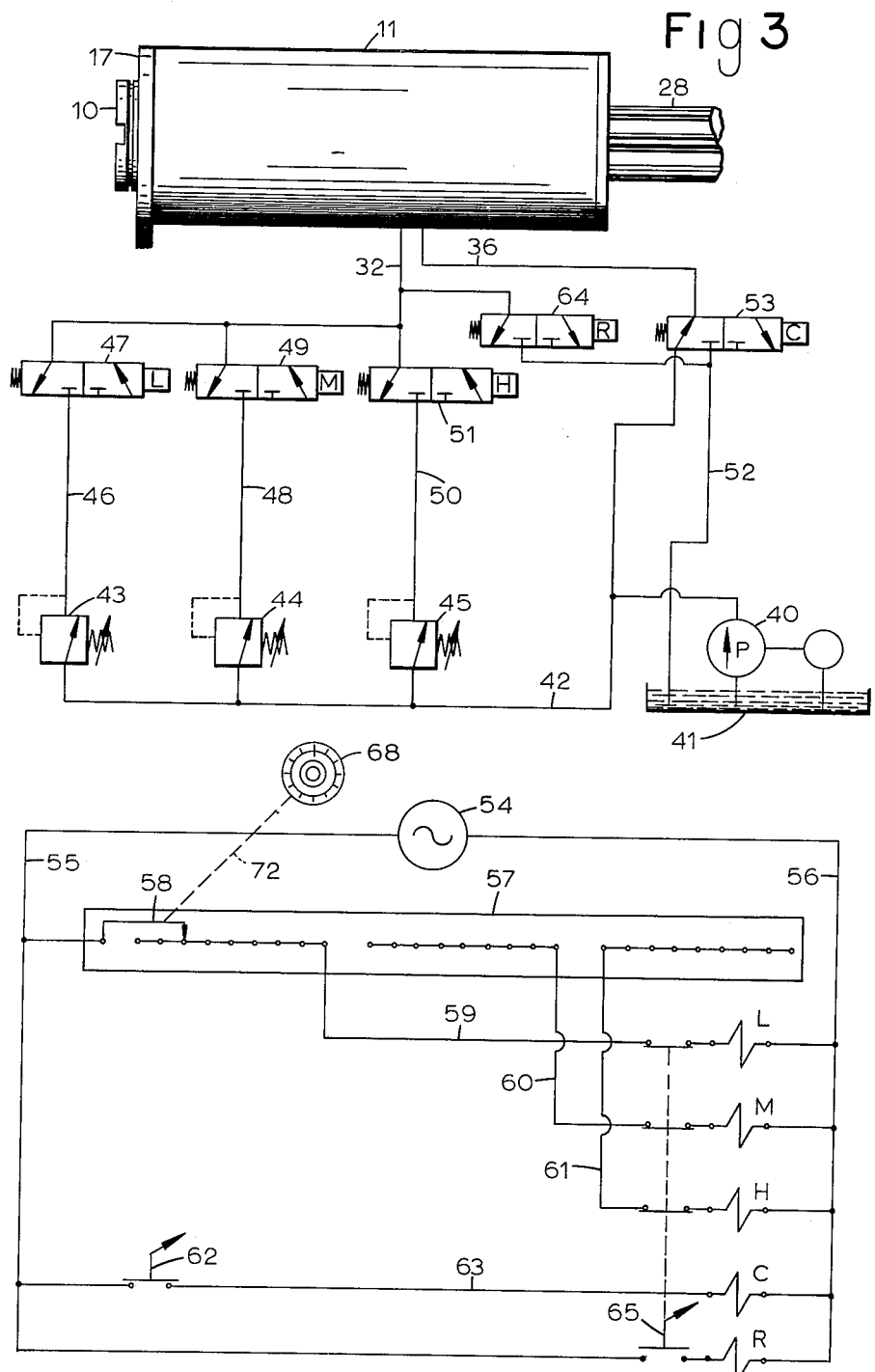

United States Patent Office 3,222,991
Patented Dec. 14, 1965

3,222,991
BEARING PRELOAD MECHANISM FOR MACHINE TOOL
Kendall F. Bone, Cincinnati, Ohio, assignor to The Cincinnati Milling Machine Co., Cincinnati, Ohio, a corporation of Ohio
Filed May 22, 1964, Ser. No. 369,366
5 Claims. (Cl. 90—11)

This invention relates to machine tool spindle mechanisms more particularly to a mechanism for selectively varying the preload on the spindle bearings in accordance with the ranges of speed of spindle rotation.

It is a common practice to preload the bearings in machine tool spindles such as milling machine spindles adapted to hold cutting tools, especially since the cutting load frequently varies rapidly during machining operations causing torque load and deflection forces acting on the spindles to vary accordingly. Any looseness in such an environment will cause a loss of accuracy due to excessive ranges of cutter deflection, machine vibration and chatter of the spindles and their associated mechanisms. The preload eliminates shake and chatter and reduces deflection during the use of the spindles by causing them to be rigidly held. The preloading does have some adverse effect, however. The friction forces in the preloaded spindles are directly proportional to the amount of preloads and in a spindle which must be operated at high speed, excessive heat is generated unless the preload is low in magnitude. A spindle which is used in low speed operation can tolerate a much higher magnitude of bearing preload without excessive heat generation.

It is therefore an object of this invention to provide a spindle mechanism in which a selectively variable spindle bearing preload is available.

It is also an object of this invention to provide a spindle bearing preload mechanism that is adjusted in accordance with spindle speed ranges.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, the combination of this invention includes a mechanism adapted to produce an axial force on the spindle to tend to move it firmly against the main spindle bearings. This axial force provides the bearing preload in the main spindle bearings and after application of the force, the spindle is clamped tightly in position relative to the bearing by a releasable locking mechanism so that the strain resulting from the preload stress is locked into the spindle mechanism. The axial force is produced hydraulically in response to the selected speed range in which the spindle is to operate and is inversely proportional thereto. That is, when the speed range is low, the preload is relatively high and when the speed range is high, the preload is relatively low. A clear understanding of the construction and operation of this invention can be obtained from the following detailed description wherein:

FIG. 1 is a longitudinal section view of a milling machine spindle mechanism.

FIG. 2 is a partial section view of the spindle mechanism of FIG. 1 showing an alternate construction.

FIG. 3 is a schematic hydraulic circuit for supplying fluid to the spindle bearing preload mechanism shown in the spindle of FIGS. 1 and 2.

FIG. 4 is a schematic electrical control diagram for operation of the hydraulic circuit of FIG. 3.

The mechanism shown in FIG. 1 includes a spindle 10 which is held in a support member in the well known form of a quill 11. The quill 11 in turn is supported in a spindle housing 12 and may be axially movable in the housing 12 although mechanism for such movement is not shown in FIG. 1 since it forms no part of the present invention. The spindle 10 is held at its forward end in main spindle bearings 13, 14 and 15 which are received at a fixed location in the quill 11. A cover plate 16 is secured to the quill 11 by machine screws 17 and the cover plate 16 is received against the outer race of the forward main bearing 13. The outer race of the bearing 13 in turn is received directly against the outer race of the bearing 14. The outer race of the bearing 14 is received against an anular spacer member 18 in the quill 11. The spacer member 18 bears against the outer race of the other main bearing 15 on one side and the other side thereof is received against a spacer member 19 which is engaged firmly against a shoulder 20 in the quill. In this manner, the bearings 13, 14 and 15 are held in their fixed position in the quill 11. Toward the rearward end of the spindle 10, an additional set of bearings 21, 22 is provided. The bearings 21 and 22 are held at a fixed location on the spindle 11 by a nut 23 which is tightened down against a spacer member 24 contacting directly against the inner race of the bearing 22. The inner race of the bearing 22 is received against the inner race of the bearing 21 and the bearing 21 is pushed against another spacer member 25 which is stopped against a shoulder 26 on the spindle 10. The outer races of the bearings 21 and 22 are tightly received in a member 27 which extends around the bearings and therefore the bearings 21, 22 cannot shift their axial position therein. The rear of the spindle 11 is splined as shown at 28 and the spindle is rotated by a conventional gear transmission drive mechanism connected to the splines 28. The speed transmission is represented schematically by a block 67 and it contains a plurality of gears and shafts shiftable into selected combinations in response to the setting of a selection dial 68. Transmissions of this type are old in the art and additional description herein is omitted. The transmission 67 is connected to the spindle 10 at the splines 28 by gearing which is also only shown schematically herein as a broken line 69. Power to the transmission is provided at an input shaft 70 by a motor 71.

The axial preload of the spindle 10 relative to the main bearings 13, 14 and 15 is provided by a force acting rearwardly, that is toward the right as viewed in FIG. 1, on the outer races of the bearings 21 and 22. The preload stress is provided by an annular plunger member 29 that is fixed to the member 27 and received loosely around the spindle 10 to bear directly against the outer race of the bearing 21. The plunger 29 is axially movable in the quill 11 and for this purpose a plurality of axially arranged cylinders 30 are formed in the plunger 29 at spaced locations around one end thereof and each of the cylinders 30 has a piston 31 slidably received therein. Fluid under pressure can be introduced into the cylinders 30 through a fluid line 32 which communicates with each of those cylinders 30. When fluid under pressure is introduced into the cylinder 30, forces are applied to the plunger 29 and the pistons 31 causing the pistons 31 to be forced against a shoulder 33 in the quill 11 while the plunger 29 is forced in the rearward direction to bear against the outer race of the bearing 21. The force resulting from the plunger 29 shifting against the bearings 21 and 22 is transmitted directly to the spindle 10 through the nut 23 and this force tends to move the spindle 10 rearwardly in the quill 11. A shoulder 34 on the spindle 10 is then pulled back against the inner race of the bearing 13 to produce a preloading stress in that bearing and the bear 14. A spacer member 66 between the inner races of the bearings 14, 15 also causes a force to be applied to the bearing 15 and that bearing is also preloaded. The magnitude of the preload force in the spindle mechanism and the stress in the bearings 13, 14, 15 depends directly upon the pressure of the fluid introduced through the line 32 into the cylinders 30.

The strain resulting from the preload stress created by the fluid pressure in the cylinders 30 is maintained in the bearings 13, 14 and 15 by locking the plunger member 29 in position in the quill 11 after the fluid under pressure has been supplied through the line 32. The previously mentioned sleeve 27 is attached integrally with the plunger 29 by welding and therefore the sleeve 27 and plunger 29 move together. The sleeve 27 has a thin section 35 that extends around it near one end and this section is backed by a cavity to which fluid under pressure can be connected through a line 36. Fluid under pressure behind the section 35 tends to bulge that section outward toward the quill 11 to provide a strong clamping force that holds the sleeve 27 in place in the quill 11. Since the plunger 29 is welded to the sleeve 27, the plunger 29 likewise is clamped in a fixed position in the quill 11. Thus, the strain resulting from the preload stress on the spindle 10 is maintained in the bearings 13, 14, 15 until pressure is removed from behind the thin section 35 and a change in pressure occurs in the fluid line 32.

An alternate construction for the preload mechanism is shown in FIG. 2 where the plunger member 29 is provided in an altered form which has a flange 37 extending annularly therearound. The flange 37 bears slidably along the inside of the quill 11. To the left of the flange 37, as viewed in FIG. 2, is a plunger member 38 which is of annular form extending completely around the plunger member 29 and which is slidably received between that member and the quill 11. A space 39 is provided between the flange 37 and the plunger ring 38 into which fluid under pressure can be introduced by the same fluid line 32 as shown in FIG. 1. When fluid under pressure is introduced into the space 39, a force is applied to the ring 38 which moves it against the same shoulder 33 around the quill 11 and at the same time a force urges the plunger 29 against the outer race of the bearing 21 as in the first embodiment to produce the axial preloading stress. The sleeve 27 in this alternate embodiment is also attached to the plunger 29, as by welding, and the clamping action is again produced by the introduction of fluid under high pressure behind the thin section 35. Thus with either of the embodiments described, the preload force is hydraulically produced and the resulting strain in the main bearings 13, 14 and 15 is then preserved by the same clamping action at the thin section 35 of the sleeve 27.

The schematic drawing of FIG. 3 shows a fluid circuit by which fluid under pressure is connected selectively to the preload line 32 and to the clamp line 36. A pump 40 draws fluid from a reservoir 41 and supplies it under pressure to a main pressure line 42. The main pressure line 42 communicates with each of three pressure reducing valves 43, 44 and 45. Each of these valves is set to reduce the pressure of fluid supplied by the line 42 to some predetermined level depending upon the adjustable setting of each of these reducing valves. Each of the reducing valves 43, 44, 45 is then a source of fluid under pressure and each supplies fluid at a pressure different from the others which can be connected to the plunger 29. The reducing valve 43 is adjusted to supply fluid to a line 46 under the highest pressure of the three valves 43, 44, 45 and the line 46 is connected to a solenoid operated valve 47. The reducing valve 44 supplies fluid to a fluid line 48 and maintains the pressure therein at a level lower somewhat than the pressure in line 46. The fluid line 48 connects the reducing valve 44 with a second solenoid operated valve 49. The reducing valve 45 reduces pressure from the main pressure line 42 to a level below that supplied to line 48 by the valve 44 and this relatively low pressure fluid is connected to a fluid line 50 that communicates with a third solenoid operated valve 51. The solenoid operated valves 47, 49 and 51 are selectively actuated one at a time by solenoids L, M and H, respectively. These solenoids are energized for operation in response to the range of speed in which the spindle 10 is to be rotated. The solenoid L is operated only in a range of low spindle speeds; the solenoid M is operated only in a range of medium spindle speeds; and the solenoid H is operated only in a range of high spindle speeds. As shown in FIG. 3 each of these solenoids L, M and H is in its normal or deenergized state. The preload line 32 that communicates with each of the valves 47, 49 and 51 is also connected directly to a solenoid operated valve 64 to which a main return line 52 to the reservoir 41 is connected. The valve 64 is operated by a solenoid R and when the solenoid R is energized, the preload line 32 is connected to the main return line 52 to relieve any preload force. The solenoid R is not energized when any one of the other solenoids L, M and H is energized. Thus with the solenoid L energized, the valve 47 is in its alternate or operated state and fluid from line 46 is connected to line 32 to provide a high preload strain. In the same manner when the solenoid M is energized, fluid under pressure from the line 48 is connected through the valve 49 to line 32 to provide a lesser preload strain for medium speed range operation of the spindle 10. With the solenoid H energized, pressure from line 50 is connected through the valve 51 to line 32 and the lowest of the available preload strains is provided to allow high speed operation of the spindle 10 without excessive heat generation.

The circuit of FIG. 3 also shows a fifth solenoid operated valve 53 that is operated to connect fluid under pressure from the line 42 to the clamp line 36 when it is desired to lock the preload into the system. A clamp solenoid C is provided to operate the valve 53 and when the solenoid C is in its deenergized state as shown, fluid under pressure is connected from the line 42 to the line 36. When energized, the solenoid C shifts the valve 53 to connect the main return line 52 to the line 36 to release the clamping force and to allow a change of preload to be made in the system.

The diagram of FIG. 4 shows, in schematic form, an electrical circuit for controlling the solenoids of the fluid circuit described in FIG. 3. A source of alternating voltage is provided at 54 and supplies power to lines 55 and 56. Item 57 represents a bank of contacts on a rotary stepping switch that is set in accordance with the speed selected for spindle operation. To this end, the speed selection dial 67 is mechanically connected by a linkage 72 to a wiper 58 of the switch bank 57. The wiper 58 then is moved from one to another of the contacts of the bank 57 which correspond, left to right, to available spindle speeds in the order of progression from low to high speeds. As shown, a conductor 59 is serially connected with a plurality of the contacts of the switch bank 57 and as shown the wiper 58 connects power from the line 55 to the line 59. The line 59 is connected to one side of the solenoid L and the other side of the solenoid L is connected directly to the power line 56. Therefore in the state described the circuit of FIG. 4 connects power across the solenoid L and the valve 47 of FIG. 3 would be shifted from the condition of FIG. 3 to its energized condition to connect the relatively high pressure of line 46 to the preload line 32. This corresponds to a selection of one of the speeds in the low speed range. All of the contacts to which the line 59 is serially connected would be contacts corresponding to speeds in the low spindle speed range. In a similar manner, a conductor 60 is connected to a second group of contacts of the stepping switch bank 57 and the line 60 is connected to one side of the solenoid M whose other side is connected directly to the power line 56. When any of the contacts connected to the conductor 60 is contacted by the wiper 58, the solenoid M will be energized and the valve 49 will be operated to connect the medium fluid pressure of line 48 to the preload line 32. This occurs when a medium range spindle speed is selected. A conductor 61 connects a third set of the contacts of the stepping switch bank 57 to the solenoid H. When the wiper 58 is in contact with any of this last group of contacts, the solenoid H is energized to shift the valve 51 and connect the low pressure fluid of the line 50 to the preload line 32. From this it can be seen that the preload stresses produced by fluid under pressure at the line 32 are dependent upon the selected speed of operation for the spindle 10. While only three speed ranges, low, medium and high, have been described, it can be seen that any number of preload fluid pressures could be similarly supplied, up to the number of spindle speeds available if desired.

The circuit of FIG. 4 also shows the solenoids C and R. The solenoid C is connected at one side to the power line 56 and at its other side to the power line 63 which extends to a switch 62. The switch 62 is shown for purposes of illustration only as a manually operated, latching switch but it could be replaced by one of several types of switch mechanisms. The switch 62 must be changed from the open condition shown to its closed condition to energize the solenoid C before a change in preload can be accomplished. Thus the switch 62 might be connected such that it is closed when the stepping switch 57 is advanced from one contact to another. In this manner the clamping force resulting from fluid under pressure in line 36 would be released at the time a change of preload due to a change in pressure connection in line 32 might be made. The preload relief solenoid R can be energized by the closing of a manually operated, latching switch 65 to connect the solenoid across the power lines 55, 56. As shown, the switch 65 also has a normally closed contact in each of the conductors 59, 60 and 61 which is opened when the solenoid R is energized. Therefore each of the solenoids L, M and H will be deenergized to remove the pressure connection to the line 32 when it is connected to exhaust pressure.

From the foregoing detailed description it can be seen that a selected preload strain in the spindle bearings 13, 14 and 15 can be had and that the preload strain is caused to be dependent upon the range of speed in which the spindle is to operate. Although the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:

1. In a machine tool having a spindle rotatable at a selected one of a plurality of speeds and supported in a set of bearings received at a fixed axial location, a mechanism for axially preloading the bearings of said set comprising in combination:
    (a) means for producing a preloading force acting in the axial direction of the spindle and having a magnitude dependent upon the one speed of spindle rotation selected,
    (b) means for applying said preloading force to the spindle to produce a corresponding preload strain in the set of bearings, and
    (c) means for locking the spindle and set of bearings in a fixed axial relationship to maintain said preload strain in the set of bearings.

2. In a machine tool having a support member in which a spindle is rotatable at a selected one of a series of speeds and is held in a set of bearings received at a fixed axial location in the support member, a mechanism for axially preloading the bearings of said set comprising in combination:
    (a) an annular plunger received in the support member and around the spindle,
    (b) supply means for individually furnishing fluid under a series of pressure magnitudes,
    (c) flow control means operable selectively for connecting fluid from said supply means at each magnitude to said plunger to produce a corresponding preload force thereon tending to move said plunger in the support member and along the spindle,
    (d) means to transmit said preload force from said plunger to the spindle to tend to move the spindle axially through the bearings and produce a corresponding preload strain therein,
    (e) operating means for determining the individual pressure magnitude connected to said plunger by said flow control means in accordance with the selected speed for rotation of the spindle, and
    (f) releasable means for locking said plunger in the support member to maintain said preload strain in the bearings.

3. In a machine tool having a support member in which a spindle is rotatable at a selected one of a plurality of speeds and is held in a set of bearings received at a fixed axial location in the support member, a mechanism for axially preloading the bearings of said set comprising in combination:
    (a) an annular plunger received in the support member and around the spindle,
    (b) a fluid supply circuit including a plurality of sources of fluid under pressure each adapted to supply fluid at a pressure different from the other sources and a plurality of control valves connected in circuit between said plunger and fluid sources, each of said control valves actuable to connect a respective one of said sources of pressure to said plunger to produce a hydraulic preload force thereon tending to move said plunger along the spindle,
    (c) means on said spindle for stopping movement of said plunger and transmitting said preload force thereto to tend to move said spindle through the bearings and produce a preload strain therein, and
    (d) control means operable in response to spindle speed selection for actuating said control valves.

4. In a machine tool having a support member in which a spindle is rotatable at a selected one of a plurality of speeds and is held in a set of bearings received at a fixed axial location in the support member, a mechanism for axially preloading the bearings of said set comprising in combination:
    (a) an annular plunger received in the support member and around the spindle,
    (b) a fluid supply circuit including a plurality of sources of fluid under pressure each adapted to supply fluid at a pressure different from the other sources and a plurality of control valves connected in circuit between said plunger and fluid sources, each of said control valves actuable to connect a respective one of said sources of pressure to said plunger to produce a hydraulic preload force thereon tending to move said plunger along the spindle,
    (c) means on said spindle for stopping movement of said plunger and transmitting said preload force thereto to tend to move said spindle through the bearings and produce a preload strain therein.
    (d) means for clamping said plunger in the support member when said preload force is produced to maintain the preload strain in the bearings, and
    (e) control means operable in response to spindle speed selection for actuating said control valves.

5. In a machine tool having a support member in which a spindle is rotatable at a selected one of a plurality of speeds and is held in a set of bearings received at a fixed axial location in the support member, a mechanism for axially preloading the bearings of said set comprising in combination:

(a) an annular plunger received in the support member and around the spindle,
(b) a source of fluid under pressure,
(c) a plurality of pressure reducing valves connected to said source and each adjusted to supply fluid under pressure at a pressure reduced from said source and different from the others of said reducing valves,
(d) a plurality of control valves, each of said control valves connected between a respective one of said pressure reducing valves and said control plunger and actuable to connect fluid to said plunger to produce a preload force thereon proportional to the fluid pressure connected thereto for movement thereof along the spindle,
(e) means on said spindle for stopping movement of said plunger and transmitting said preload force therefrom to tend to move said spindle through the bearings and produce a preload strain therein,
(f) means for clamping said plunger in the support member when said preload force is produced to maintain the preload strain in the bearings, and
(g) a switch mechanism set in response to spindle speed selection and operable to selectively actuate said control valves, one at a time, in response to the setting thereof.

References Cited by the Examiner
UNITED STATES PATENTS

| | | | |
|---|---|---|---|
| 1,982,265 | 11/1934 | Nenninger | 90—18 |
| 2,957,393 | 10/1960 | Kampmeier. | |
| 3,034,408 | 5/1962 | Kampmeier. | |

WILLIAM W. DYER, JR., *Primary Examiner.*